June 13, 1950     C. M. LEE     2,511,212
ATTACHING MEANS FOR LENS MOUNTS
Filed Sept. 10, 1947

CHARLES M. LEE
INVENTOR
BY Newton M. Perrins
J. Griffin Little
ATTORNEYS

Patented June 13, 1950

2,511,212

UNITED STATES PATENT OFFICE 2,511,212

ATTACHING MEANS FOR LENS MOUNTS

Charles M. Lee, Rochester, N. Y., assignor to Eastman Kodak Company, Rochester, N. Y., a corporation of New Jersey Application September 10, 1947, Serial No. 773,197

10 Claims. (Cl. 88—57)

The present invention relates to cameras, and more particularly to a lens mount attaching mechanism therefor.

The present invention has as its principal object the provision of a lens mount attachment which is simple, rugged and effective.

Still another object of the invention is the provision of a lens mount in which the prism may be oriented to a desired position.

Yet another object of the invention is the provision of an attachment which enables the lens barrel to be connected selectively to the camera in any one of four positions.

And another object of the invention is the provision of a positioning and clamping means for retaining the lens barrel and prism in proper relation to the camera.

To these and other ends, the invention resides in certain improvements and combinations of parts, all as will be hereinafter more fully described, the novel features being pointed out in the claims at the end of the specification.

Figure 1:
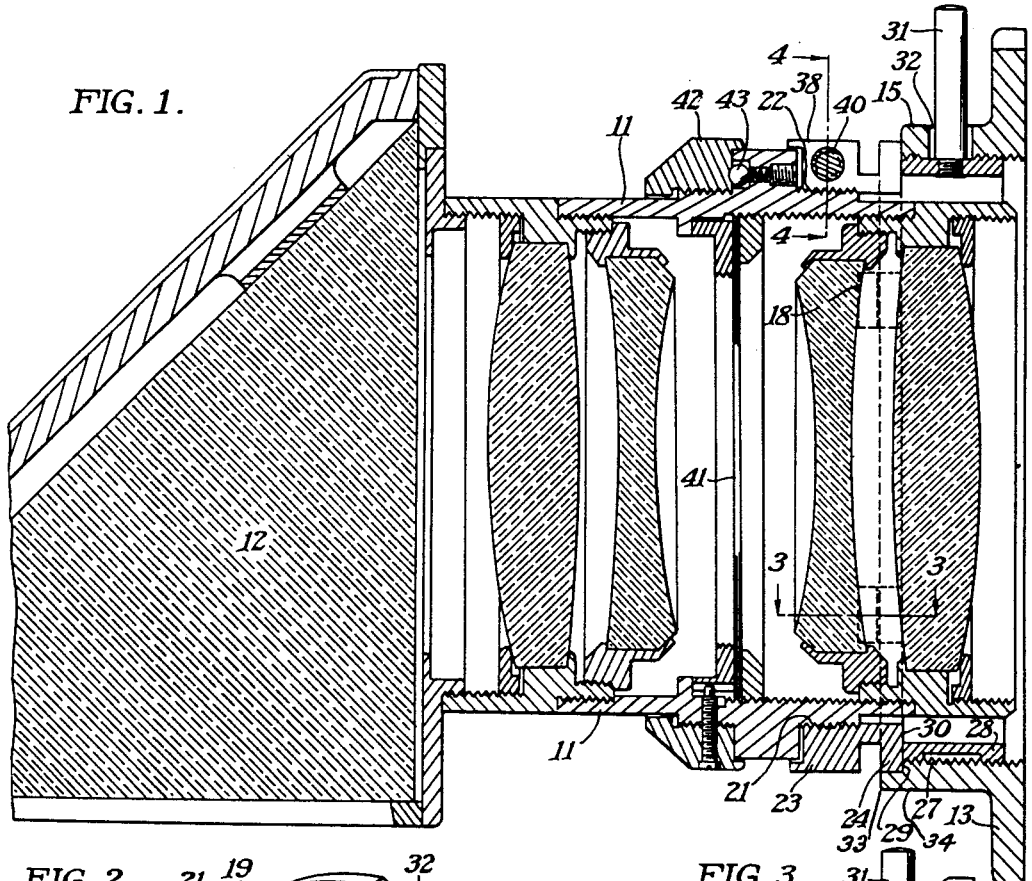
Fig. 1 is a longitudinal sectional view through a lens barrel and prism, showing the relation thereto of an attaching mechanism constructed in accordance with the present invention.
Figure 3:
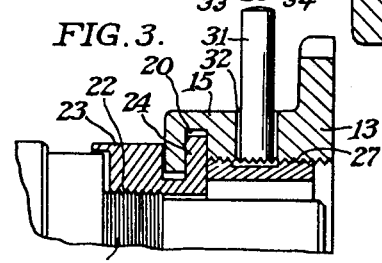
Figure 4:
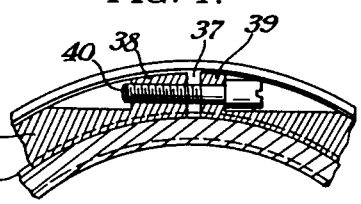

Fig. 3 is a partial longitudinal sectional view through the mechanism illustrated in Fig. 1 and taken substantially on line 3—3 thereof, showing the arrangement for clamping the parts in connected relation; and Fig. 4 is a partial transverse sectional view through the mechanism illustrated in Fig. 1 and taken substantially on line 4—4 thereof, showing the releasible connecting means for the expansible collar.

Similar reference numerals throughout the various views indicate the same parts.

The present invention is embodied, in the present instance, in an attaching mechanism for connecting a lens barrel 11 releasibly to the front of a camera. The front end of the mount has secured thereto a prism 12 for directing the light rays from a laterally arranged object to the lens elements positioned in the lens tube, as is customary with copying cameras of well-known construction.

A ring 13 is provided with holdes 14 to receive screws or other fastening means for securing the ring to the front of the camera, not shown.

A tubular sleeve 15 projects forwardly from the ring and terminates in an attaching plate 16 to which the lens barrel and prism may be detachably secured in a manner to be later described. The plate 16 is in the form of a hollow square so as to provide a central opening or aperture through which the light rays from the lens barrel may pass to the sensitized material positioned at the rear of the camera, as is apparent. The ring 13, sleeve 15 and plate 16 are integral and provide a single means to which the lens barrel may be secured detachably. Therefore, these members may be broadly considered as a single mechanism or plate for mounting the lens barrel. The plate 16 is provided with bent-up sides 17, as best shown in Fig. 2, each of which is formed with a pair of spaced inwardly-extending lugs 18 which are parallel to and overlie the front face 19 of the plate 16 and cooperate therewith to form, in effect, a vertically-arranged marginal track or guideway 20, the purpose of which will be later described.

The rear end of the lens barrel 11 is threaded at 21 to engage a corresponding thread 22 formed on a tubular member or sleeve 23 preferably formed integral with a square plate 24 which is slightly smaller than the plate 16. Each side face 25 of the plate 24 is provided with a pair of open-end slots or notches 26 which are spaced a distance equal to the spacing of the lugs 18. It will be apparent that if the plate 24 is brought adjacent and parallel to the plate 16, with the slots 26 registering with the lugs 18, the plate 24 may be moved axially to pass the lugs through the slots and to position the opposite faces 25 of the plate 24 in the track or guideway 20. Now by moving the plate 24, with its attached lens barrel 11 and prism 12, radially or downwardly, the slots 26 will be moved out of register with the lugs 18 to lock the plate 24 in the guideways 20, as shown in Fig. 2. The lugs 18, guideway 20 and slots 26 provide, in effect, a simple and effective bayonet lock construction for connecting the parts detachably. The connecting or disconnecting of the parts requires only a slight relative movement, as is apparent. As each side face 25 of the plate 24 is provided with a pair of slots 26, the barrel 11 and prism 12 may be positioned accurately in any one of four positions spaced 90 degrees apart so that the prism may be directed in the desired relation.

In order to maintain the plate 24 accurately in position in the guideways 20, means is provided for clamping the plates 16 and 24 together. To this end, the sleeve 15 is formed with an internal thread 27 along which a threaded tubular sleeve 28 may move. It is apparent from an inspection of Fig. 3, that when the sleeve 28 is moved to the left along thread 27, the left end 29 will engage the rear face 30 of the plate 24 to urge the latter forwardly and into clamping relation with the lugs 18 to hold the parts tightly in adjusted relation. As the lugs 18 are formed integral with the plate 16, the sleeve 28 may be broadly considered as means of clamping the plates 16 and 24 together. An operating handle 31 is secured to the sleeve 28 and projects radially through an arcuate slot 32 formed in sleeve 15 so that by merely rocking the handle, the sleeve 28 may be moved axially to clamp or release the plates 16 and 24.

Figure 2:
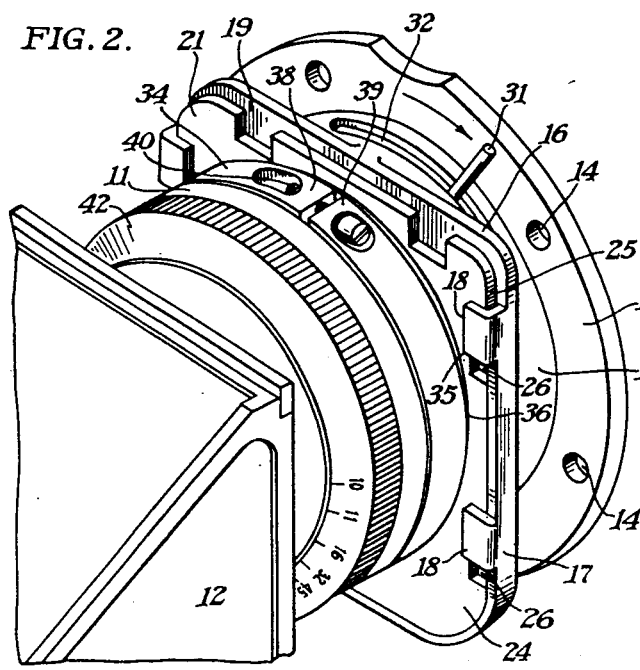
Fig. 2 is a perspective view of the parts illustrated in Fig. 1, showing the arrangement by which the lens and prism may be connected selectively in any one of four positions.

When the plate 24 has been assembled and connected to the plate 16, in the manner above described and shown in Figs. 1 and 2, the lowermost face 25 of the plate 24 will engage a forwardly extending lip or lug 33 on the lower edge 34 of the plate 16 to limit further downward movement of the plate 24. This lip thus acts as a stop which accurately positions the lens barrel 11 and prism 12. In addition, the lip also provides means for supporting the plate 24 and hence the lens barrel and prism connected thereto.

When the parts are in the position shown in Figs. 1 and 3, and the operator wishes to disconnect the entire assembly from plate 16, it is merely necessary to raise the plate 24 upwardly until the notches 26 are brought into register with the lugs 18. Then a straightforward or axial movement serves to move the plate 24, and attached parts, forwardly so as to allow the lugs 18 to pass through the slots 26. Thus, a slight vertical combined with an axial movement serves to disconnect, or connect, the parts to plate 16. As the plate 24 is only slightly larger than the sleeve ring 23, the vertical movement necessary to disconnect the parts may bring the surface 34 of the sleeve 23 into engagement with the lower edge 35 of the upper lugs to prevent complete registration of the lugs and slots. Obviously, this difficulty could be overcome by cutting off the corners of the lugs. It is preferred, however, to provide the surface 34 with a peripheral groove 36 into which the lugs 18 may extend during the connecting or disconnecting operation. These grooves provide the desired clearance between the sleeve 23 and the lugs 18.

After the parts have been assembled, it may be desirable to rotate the prism to change the position thereof without necessitating disconnecting the plates 16 and 24. To secure this result, the ring 23 is split at 37, Fig. 4, and is provided with a pair of upstanding ears 38 and 39. A screw 40 extends through ear 39 and engages a threading opening in ear 38. It is apparent, that when the screw 40 is turned in one direction, the ears 38 and 39 will be drawn together to clamp thread 22 into locking relation with the thread 23 to hold the lens barrel 11 and prism 12 in adjusted position. However, when the position of the prism is to be changed, it is merely necessary to turn screw 40 in the opposite direction to separate ears 38 and 39. This separation of the ears loosens the thread 32 to permit the lens barrel and prism to be turned to the desired position relative to the ring 34. Whereupon, the screw 40 is again tightened to draw ears 38 and 39 together to clamp thread 22 into engagement with thread 21.

The lens barrel 11 may have positioned thereon an adjustable diaphragm 41 connected in any suitable and well-known manner to a diaphragm-operating means 42 carried by the outer surface of the lens barrel. "Click" stops may be provided for the diaphragm-operating ring and these stops may be in the form of a spring press ball 43 adapted to engage in detents formed in the operating ring 42.

The present invention thus provides a lens mount attachment which enables the lens barrel and prism to be readily, quickly and accurately connected to an attaching plate secured to the camera front. The connection serves to position the barrel and to support the latter and the prism. In addition, the prism and barrel may be attached in any one of four positions spaced 90 degrees apart. When the parts are in connected relation, they are readily clamped in position, but may be readily disconnected when desired. In addition, when the plates are in clamped relation, a split clamping ring may be released to permit the lens barrel and prism to be rotated to the proper position to photograph the objects to be recorded.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

I claim:

1. A lens mount attaching mechanism comprising, in combination, an apertured plate adapted to be attached to the front of a camera, a lens barrel, a flange plate, an expandible threaded collar carried by said flange plate and adapted to receive said barrel. means for releasing said collar to permit said barrel to be turned relative to said flange plate, means for detachably connecting said plates. and means on said apertured plate for supporting the flange plate to position said barrel relative to said camera.

2. A lens and prism mount attaching mechanism comprising, in combination, an apertured plate adapted to be attached to the front of a camera, a lens barrel having lens elements positioned therein, a prism secured to the front of said barrel, a flange plate. an expandible collar carried by said flange plate and adapted to receive the rear end of said barrel, means for expanding said collar to permit said prism to be turned relative to said flange plate, means for connecting said flange plate detachably to said apertured plate, means on said apertured plate for supporting said flange plate and positioning said barrel and prism relative to said camera, and an axially movable member having coacting means carried by said apertured plate for clamping said plates together.

3. A lens mount attaching mechanism comprising, in combination, an apertured plate adapted to be attached to the front of a camera, lugs carried by said plate and overlying the latter and cooperating therewith to form guideways, a lens barrel, a flange secured to said barrel, said flange being formed with slots which when brought into registry with said lugs will permit the flange to be moved axially toward said plate and into said guideways, radial movement of said flange then serving to move said slots out of registry with said lugs to lock said flange in said guideways, and means for limiting the radial movement of said flange to position said barrel relative to said camera.

4. A lens mount attaching mechanism comprising, in combination, an apertured plate adapted to the front of a camera, lugs carried by said plate and overlying the latter and cooperating therewith to form guideways, a lens barrel, a flange secured to said barrel, said flange being formed with slots which when brought into registry with said lugs will permit the flange to be moved axially toward said plate and into said guideways, radial movement of said flange then serving to move said slots out of registry with said lugs to lock said flange in said guideways, means for limiting the radial movement of said flange to position said barrel relative to said camera, and means on said plate for engaging said flange to support the latter and said barrel.

5. A lens mount attaching mechanism comprising, in combination, an apertured plate adapted to be attached to the front of a camera, lugs carried by said plate and overlying the latter and cooperating therewith to form guideways, a lens barrel, a flange secured to said barrel, said flange being formed with slots which when brought into registry with said lugs will permit the flange to be moved axially toward said plate and into said guideways, radial movement of said flange then serving to move said slots out of registry with said lugs to lock said flange in said guideways, and a lip formed in the lower edge of said plate to limit the radial movement of said flange to position said barrel relative to said camera and to support said flange and barrel.

6. A lens mount attaching mechanism comprising, in combination, an apertured plate adapted to be attached to the front of a camera, lugs carried by said plate and overlying the latter and cooperating therewith to form guideways, a lens barrel, a flange secured to said barrel, said flange being formed with slots which when brought into registry with said lugs will permit the flange to be moved axially toward said plate and into said guideways, radial movement of said flange then serving to move said slots out of registry with said lugs to lock said flange in said guideways, means for limiting the radial movement of said flange to position said barrel relative to said camera, and a threaded member carried by said plate and movable relative thereto and into engagement with said flange to clamp the latter in tight engagement with said lugs.

7. A lens mount attaching mechanism comprising, in combination, an apertured plate adapted to be attached to the front of a camera, lugs carried by said plate and overlying the latter and cooperating therewith to form guideways, a lens barrel, a flange secured to said barrel, said flange being formed with slots which when brought into registry with said lugs will permit the flange to be moved axially toward said plate and into said guideways, radial movement of said flange then serving to move said slots out of registry with said lugs to lock said flange in said guideways, means for limiting the radial movement of said flange to position said barrel relative to said camera, a threaded member mounted inside said plate and movable axially thereof and into engagement with said flange to shift the latter axially and into tight clamping relation with said lugs, and an operating handle connected to said member and projecting through said plate.

8. A lens mount attaching mechanism comprising, in combination, an apertured plate adapted to be attached to the front of a camera, lugs carried by said plate and overlying the latter and cooperating therewith to form guideways, a lens barrel, a prism attached to the front end of said barrel, a flange, a threaded expandible collar attached to said flange and adapted to threadably receive the rear end of said barrel, means for expanding said collar to release said barrel to permit said barrel and prism to be turned relative thereto, said flange being formed with edge slots so that when said flange is positioned adjacent said plate and with said slots and lugs in registry the flange may be moved axially toward said plate to position said flange in said guideways, a radial movement of said flange in said guideways serving to move slots out of registry with said lugs to lock said flange in said guideways, and means for supporting and positioning said flange on said plate.

9. A lens mount attaching mechanism comprising, in combination, a square apertured plate adapted to be attached to the front of a camera, a pair of spaced lugs carried by the opposite side edges of said plate and overlying the latter and cooperating therewith to form marginal guideways, a lens barrel, a prism connected to the front end of said barrel, a square flange plate, an expandible threaded collar connected to said flange plate, an expandible threaded collar connected to said flange plate and adapted to threadably receive the rear end of said lens barrel, means for expanding said collar to release said barrel to permit the latter to be rotated to orient said prism relative to said camera, each edge of said flange plate being formed with edge notches spaced the same as said lugs so that when said plates are arranged in adjacent relation said lugs and certain of said notches will be in registry so that the flange plate may be moved towards said apertured plate to position the flange plate in said guideways, a radial movement of said flange plate then serving to move said notches out of registry with said lugs to lock said flange plate in said guideways, and a lip formed on the lower edge of said apertured plate for limiting the radial movement of said flange plate and to support the latter on the apertured plate, said lugs and notches permitting said flange plate to be connected to the apertured plate in a plurality of selected positions.

10. A lens mount attaching mechanism comprising, in combination, a square apertured plate adapted to be attached to the front of a camera, a pair of spaced lugs carried by the opposite side edges of said plate and overlying the latter and cooperating therewith to form marginal guideways, a lens barrel, a prism connected to the front end of said barrel, a square flange plate, an expandible threaded collar connected to said flange plate and adapted to threadably receive the rear end of said lens barrel, means for expanding said collar to release said barrel to permit the latter to be rotated to orient said prism relative to said camera, each edge of said flange plate being formed with edge notches spaced the same as said lugs so that when said plates are arranged in adjacent relation said lugs and certain of said notches will be in registry so that the flange plate may be moved toward said apertured plate to position the flange plate in said guideways, a radial movement of said flange plate then serving to move said notches out of registry with said lugs to lock said flange plate in said guideways, a lip formed on the lower edge of said apertured plate for limiting the radial movement of said flange plate and to support the latter on the apertured plate, said lugs and notches permitting said flange plate to be connected to the apertured plate in any one of four positions, a threaded sleeve mounted inside said apertured plate and movable axially thereof to engage said flange plate to move the latter towards and into clamping relation with said lugs, and an operating handle for said sleeve connected to the latter and projecting through said apertured plate.

CHARLES M. LEE.

REFERENCES CITED

The following references are of record in the file of this patent:

UNITED STATES PATENTS

| Number | Name | Date |
| --- | --- | --- |
| 761,977 | Menchen | June 7, 1904 |
| 1,849,172 | Caps | Mar. 15, 1932 |
| 2,042,005 | Hutchings | May 26, 1936 |
| 2,124,134 | Brorsen | July 19, 1938 |
| 2,293,592 | Cisski | Aug. 18, 1942 |

Certificate of Correction

Patent No. 2,511,212                                      June 13, 1950

CHARLES M. LEE

It is hereby certified that error appears in the printed specification of the above numbered patent requiring correction as follows:

Column 6, lines 27, 28, and 29, strike out the words and comma "an expandible threaded collar connected to said flange plate,"; and that the said Letters Patent should be read with this correction therein that the same may conform to the record of the case in the Patent Office.

Signed and sealed this 19th day of September, A. D. 1950.

[SEAL]

THOMAS F. MURPHY,
*Assistant Commissioner of Patents.*